T. Blume,

Polishing Metal Pulleys.

N° 26,810. Patented Jan. 10, 1860.

Witnesses

Inventor
Theodor. Blume

UNITED STATES PATENT OFFICE.

THEODOR BLUME, OF CINCINNATI, OHIO, ASSIGNOR TO HIMSELF AND W. W. HAMER & CO., OF SAME PLACE.

MACHINE FOR FACING PULLEYS.

Specification of Letters Patent No. 26,810, dated January 10, 1860.

*To all whom it may concern:*

Be it known that I, THEODOR BLUME, of Cincinnati, Hamilton county, Ohio, have invented a certain new and useful Machine for Facing Pulleys; and I do hereby declare the following to be a full, clear, and exact description of the construction and operation of the same, reference being had to the annexed drawings, making part of this specification.

The subject of the present invention is a machine adapted to face or finish the peripheries of crowning pulleys, with facility and accuracy.

Figure 1:
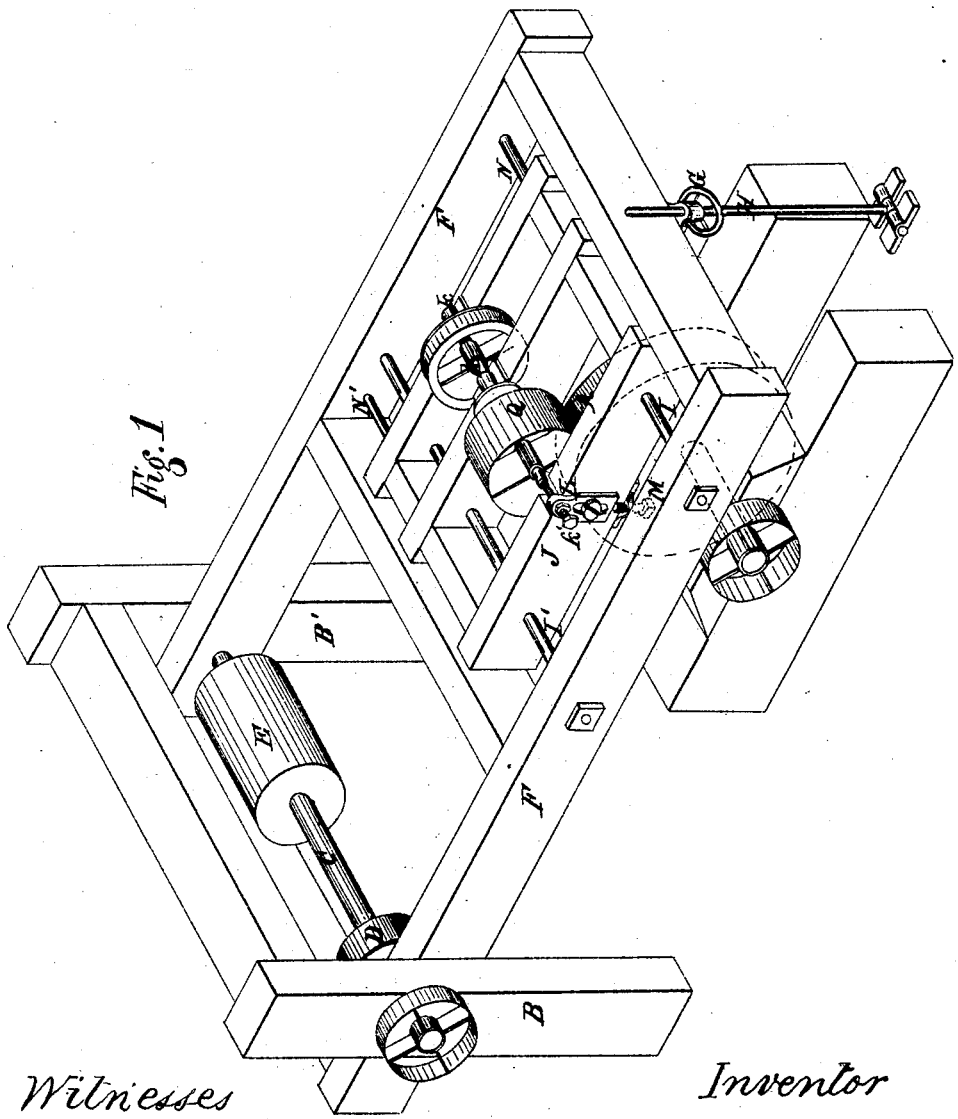
Figure 2:
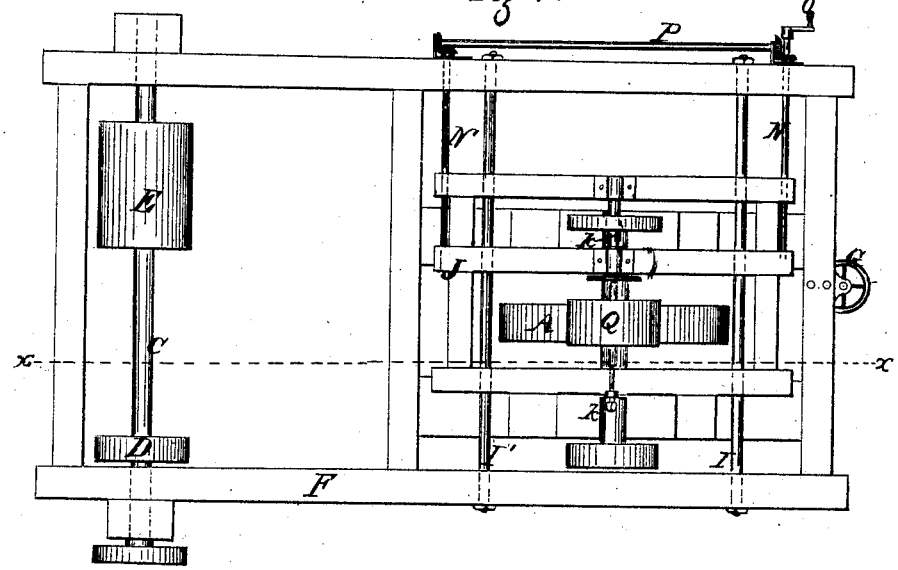
Figure 3:
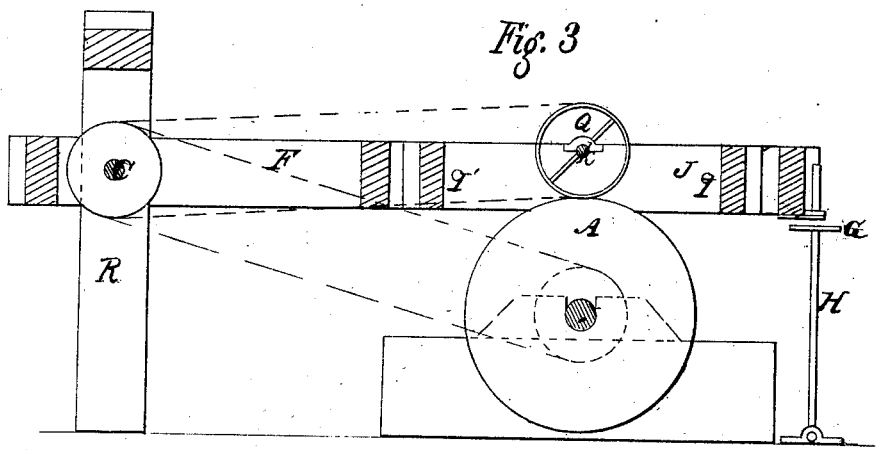

In the accompanying drawings, Figure 1, is a perspective view of the machine. Fig. 2, is a plan of the same. Fig. 3, is a vertical section at $x\ x$ Fig. 2.

A is a common grindstone.

B, B', are stanchions supporting the shaft C of two driving pulleys, D, E.

F, is a rectangular frame which is at one end hinged to the stanchions B, B', by means of the shaft C, its free end being supported by a nut G, on a screw threaded post H. The frame F, has a pair of transverse bars I, I' which form guide ways for a carriage J, in which are journaled a customary pair of lathe head and tail spindles K, K', of which the head spindle K is driven from the pulley E. The tail spindle K', is screw threaded in a bearing L, capable of vertical adjustment by a set screw M. The carriage J, is advanced or retracted on the ways, I, I', by a pair of feed screws N, N', operated simultaneously by crank O, and gearing P.

Q, represents a pulley in position for finishing. It will be seen that the contiguous surfaces of the grindstone and of the pulley Q, revolve in opposite directions, the surface of the stone moving much the more swiftly. This relative greater speed of the stone causes it to act very expeditiously and effectively and to wear equally around its periphery, although of uneven grit or density. The weight of the hinged and gravitating frame F and of its contents holds it firmly down to whatever height it may be adjusted by the nut G.

Operation: The tail spindle K', being inclined so as to correspond with the described chamfer of one-half of the periphery of the pulley and the gravitating frame F, being adjusted to its proper height, and the carriage J being run back; the rough pulley Q, to be ground, is secured in the lathe K, K', and the stone A set in motion. The carriage J is then fed slowly forward until one chamfer of the pulley's periphery is formed. The spindle K', and frame F, being then adjusted to the other chamfer, a repetition of the above described process completes the work. By this means an ordinary laborer is enabled to accurately and smoothly face a crowning pulley in less than one-tenth part of the time and with a more perfect finish than can be accomplished by an expert finisher with the customary appliances.

I claim as new and of my invention herein and desire to secure by Letters Patent—

The described arrangement of the grindstone A, hinged frame F, nut G, post H, spindles K, K', and adjustable bearing L, the whole being constructed and combined in manner substantially as and for the purpose set forth.

In testimony of which invention, I hereunto set my hand.

THEODOR BLUME.

Witnesses:
GEO. H. KNIGHT,
FRANCIS MILLWARD.